Jan. 28, 1941.    C. M. F. FRIDEN    2,229,890
CALCULATING MACHINE
Filed Feb. 29, 1936    7 Sheets-Sheet 1

FIG_2_

FIG_1_

INVENTOR.
Carl M. F. Friden
BY Philip H. Allen
ATTORNEY.

Jan. 28, 1941.  C. M. F. FRIDEN  2,229,890
CALCULATING MACHINE
Filed Feb. 29, 1936  7 Sheets—Sheet 4

INVENTOR.
Carl M. F. Friden
BY Philip H. Allen
ATTORNEY.

Jan. 28, 1941.  C. M. F. FRIDEN  2,229,890
CALCULATING MACHINE
Filed Feb. 29, 1936  7 Sheets-Sheet 7

INVENTOR.
Carl M. F. Friden
BY Philip H. Allen
ATTORNEY.

Patented Jan. 28, 1941

2,229,890

UNITED STATES PATENT OFFICE 2,229,890

CALCULATING MACHINE

Carl M. F. Friden, Oakland, Calif., assignor to Friden Calculating Machine Co., Inc., a corporation of California Application February 29, 1936, Serial No. 66,381

20 Claims. (Cl. 235—63)

The present invention relates to calculating machines for performing the operations of addition, subtraction, multiplication and division, and more particularly to machines of this class which are adapted for manual operation and which include automatic division mechanism.

Calculating machines of the type with which my invention is especially useful are illustrated in my co-pending application, Serial No. 724,482, filed May 8, 1934, and comprise generally reversible numeral wheels which are driven cyclically through reversing means from unidirectionally operable actuating means. According to my invention reversible drive means is provided for the unidirectionally operable actuator so that the operator selects the direction of actuation of the numeral wheels by the direction of operation of such driving means for problems of addition, subtraction and multiplication, while in a division operation such selection is inoperative and the direction of actuation of the numeral wheels is controlled automatically.

It is an object of my invention to provide an improved calculating machine of the character referred to which is adapted for hand operation.

Another object of the invention is to provide an improved calculating machine of the character referred to which is adapted for hand operation and which performs division problems automatically.

Another object of the invention is to provide an improved calculating machine of the character referred to in which the normal control of the sign character of the registration is disabled during an automatic operation of the machine.

Another object of the invention is to provide an improved calculating machine of the character referred to in which the normal operation of various mechanisms is interrupted during an automatic operation of the machine.

Another object of the invention is to provide an improved calculating machine of the character referred to in which the reversible drive means for controlling addition and subtraction can be used for driving the machine in automatic division operation.

Another object of the invention is to provide an improved calculating machine of the character referred to in which additive and subtractive operations are determined by the direction of operation of the drive member.

Another object of the invention is to provide an improved calculating machine of the character referred to in which the normal carriage shift is superseded by automatic shifting means in an automatic operation.

Another object of the invention is to provide an improved calculating machine of the character referred to in which shifting of the carriage is prevented during operation of the actuating means except in automatic operations.

Another object of the invention is to provide a calculating machine having improved automatic division mechanism.

Another object of the invention is to provide a calculating machine which is constructed to prevent misoperation if a division operation is terminated before completion thereof.

Other objects will appear as the description progresses with reference to the accompanying drawings.

My invention is illustrated as embodied in a calculating machine of the type disclosed in said application No. 724,482, as modified in my co-pending application Serial No. 35,619, filed August 10, 1935.

Generally, the machine comprises a body portion in which the actuating, selecting, driving and controlling mechanisms are mounted, and a register carriage mounted for endwise shifting movement on the body portion and having the accumulator and counter registers mounted therein. The body portion includes base 10 (Fig. 1) which supports casing 11 and has side frame members 12, 13 (Figs. 1 and 11) mounted thereon in spaced relation. Side members 12, 13 are connected by a plurality of cross frame members 16, 17, 18 and 19 (Fig. 1) on which are mounted various mechanisms referred to hereinafter. Carriage 21 is mounted by suitable rollers on frame members 16 and 19 for endwise shifting movement in either direction to various ordinal positions thereof.

Figures 3, 4:
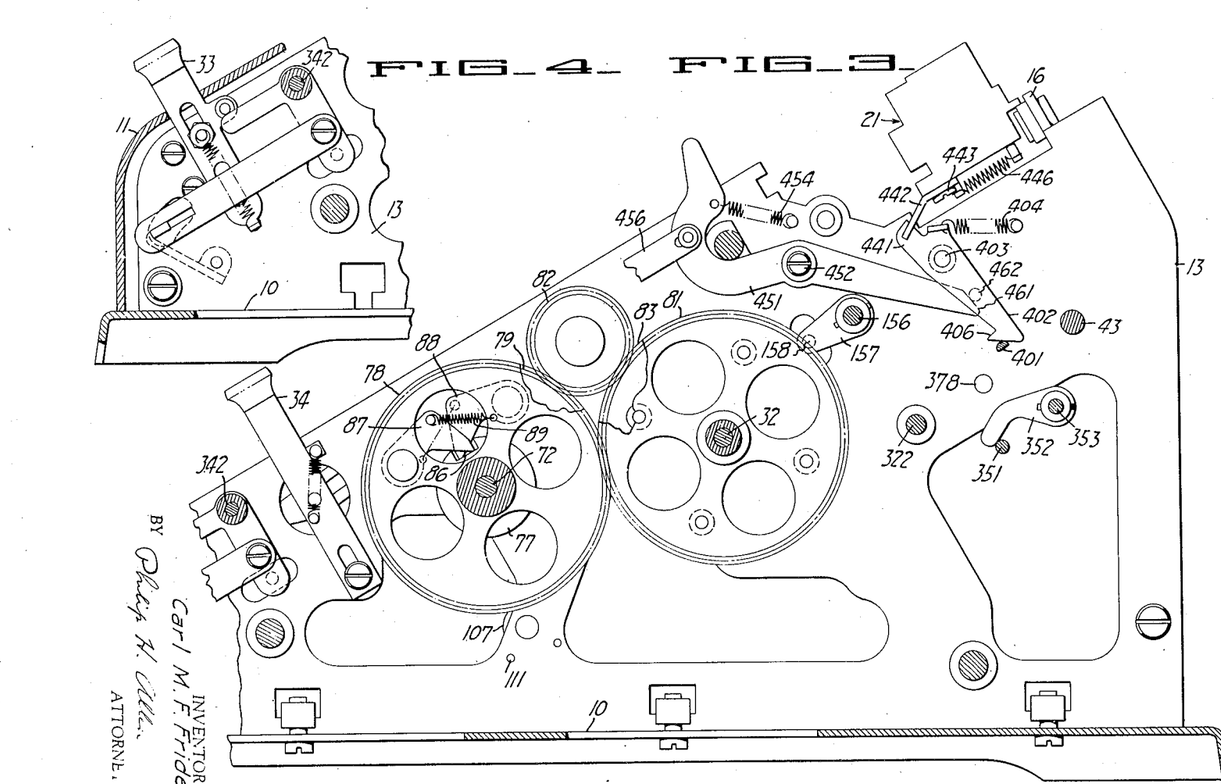
Figures 3 and 4, taken together, show a right side elevational view of the right side frame member of the machine and the driving and control mechanisms mounted thereon.

The accumulator register comprises a series of reversible numeral wheels 22 (Fig. 1), each numeral wheel 22 being mounted in carriage 21 by a shaft 23 having a bevel gear 24 to receive increments of movement from the selecting and actuating mechanism, the gear 24 being shown schematically. The values to be introduced into numeral wheels 22 are selected by means of a plurality of banks or orders of settable value keys 26, one of which banks is illustrated in part in Fig. 1. Keys 26 of each bank cooperate with selecting mechanism including a pair of spring-urged slides 27 mounted for endwise movement to position gear 28 selectively with respect to the stepped teeth (not shown) of the associated actuating cylinder 29 in accordance with the value of the depressed key. Depressed keys 26 may be released manually by operation of clear key 33 (Fig. 4) or automatically after each actuation if add key 34 (Fig. 3) is depressed. Clear key 33 and add key 34 together with their associated mechanisms are described fully in said application No. 724,482. A pair of actuating cylinders 29 (Fig. 1) for adjacent orders of the machine are mounted on an actuating shaft 31 journalled in cross frame members 17, 18. At its front end, each shaft 31 has a suitable bevel gear connection with transversely extending shaft 32, which is journalled at its ends in side frame members 12, 13 and is driven from driving mechanism described hereinafter. The actuating means described above is of the uni-directional cyclic type, that is, shafts 31, 32 and cylinders 29 rotate invariably in one direction and have one complete rotation for each actuation of the numeral wheels.

Figures 5, 6:
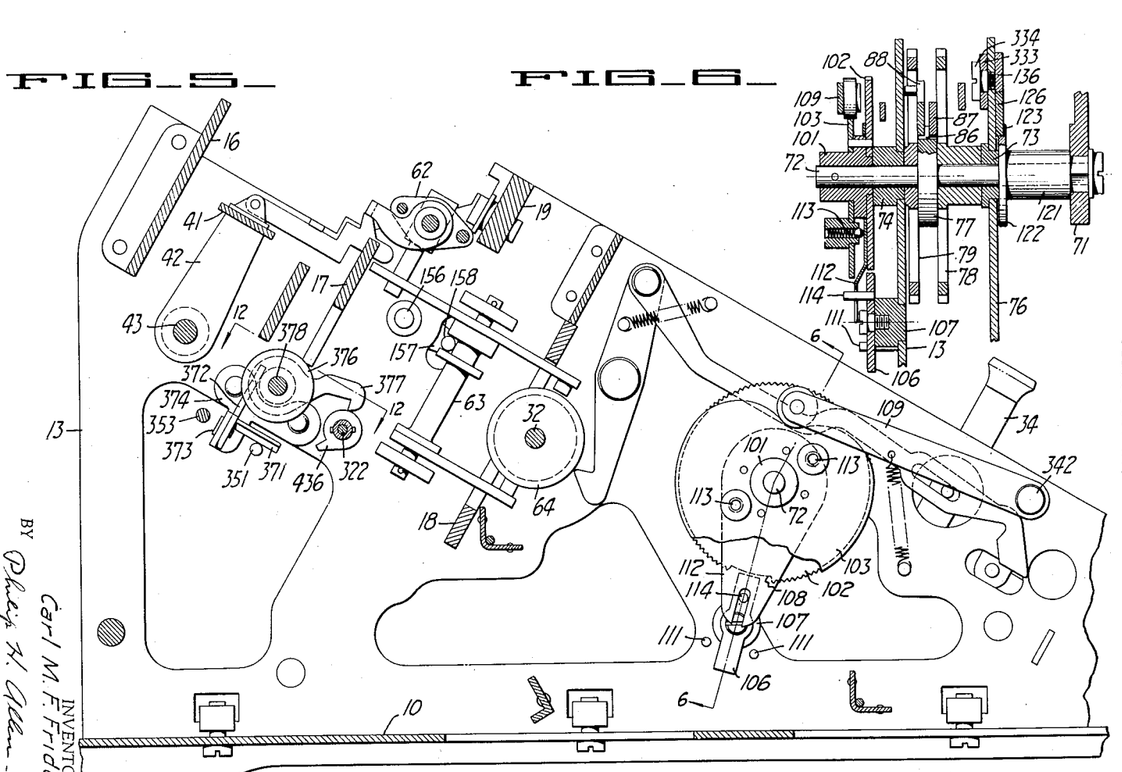
Figure 5 is a left side elevational view of the frame member shown in Figs. 3 and 4 and the driving and control mechanisms mounted thereon.
Figure 6 is a sectional view of the drive mechanism taken in planes indicated by the line 6—6 in Fig. 5.

In operation of the machine, values set into the selecting mechanism by depression of keys 26 (Fig. 1) will be introduced into numeral wheels 22 by the cooperation of gears 28 with cylinders 29 of the actuating mechanism during rotation of cylinders 29 by shafts 31 and shaft 32. To effect such transference, gears 28 of each pair are slidably mounted on a square shaft 36 which extends rearwardly and has spool 37 slidably and non-rotatably mounted thereon with opposite bevel gears 38, 39 for cooperation with the associated numeral wheel gear 24. Gears 38, 39, which are shown schematically comprise reversing means of the well known Thomas type and by selective engagement thereof with numeral wheel gears 24, the values introduced into the machine can be transferred positively or negatively to numeral wheels 22. Such selective engagement of gears 24, 38 and 39 is controlled by laterally extending strap 41 which is positioned between each pair of reversing gears 38, 39 and is mounted for movement selectively in either direction by similar arms 42 (Fig. 5) on transverse shaft 43 in a manner described later. Thus, the series of reversing gears 38, 39 provide means for connecting the actuating means to the numeral wheels to provide for registration thereon of the value determined by depression of the value keys.

Means are provided for carrying from order to order in the accumulator when the registration of a numeral wheel changes from 9 to 0 or 0 to 9, and as such mechanism is disclosed fully in said applications, only that portion necessary to an understanding of the instant invention will be described. In each order of the machine, numeral wheel shaft 23 (Figs. 1 and 2) carries single tooth gear 46 for cooperation with one arm of pawl 47 pivoted underneath carriage 21. The other arm of pawl 47 carries pin 48 for cooperation with suitable spaced flanges of collar 49 (Fig. 1) slidable on shaft 36 and carrying gear 51 for cooperation with single tooth transfer actuator 52 on the associated shaft 31, each shaft 31 carrying a pair of actuators 52 for adjacent orders. One flange of collar 49 is engaged by spaced flanges on transfer restoring shaft 53 which is slidably mounted in suitable bearings and cooperates with restoring cam 54 on the associated actuator 52. When a numeral wheel 22 passes from 9 to 0 or 0 to 9, single tooth gear 46 (Figs. 1 and 2) oscillates pawl 47 so that its pin 48 is moved to shift collar 49, (Fig. 1) gear 51, and shaft 53, so that gear 51 is positioned in the path of actuator 52 to effect the transfer, and shaft 53 is positioned in the path of cam 54 to effect the subsequent restoration of the transfer mechanism to normal inoperative position.

Suitable zero resetting mechanism of conventional construction may also be associated with numeral wheels 22, as, for example, a resetting rack 56 (Fig. 1), of the character described in said applications.

The revolutions counter or counter register provided may also be of conventional construction. For example, it may be of the character illustrated in my co-pending application, Serial No. 27,338, filed June 19, 1935, and includes numeral wheels 61 (Fig. 1) having actuating and transfer means 62 associated therewith and driven by shaft 32 in a suitable manner to register the number of actuations of accumulator numeral wheels 22. For the purpose of the instant invention, it is believed sufficient to state that the direction of actuation of counter numeral wheels 61 can be changed by shifting collar 63 (Fig. 5) and its pair of opposed arms with respect to cam drum 64, which may have a track for cooperation with each of the pins on the opposed arms of the collar 63.

The above described mechanisms may be of any conventional construction, but, as illustrated, are similar in construction and operation to the similar mechanisms of the co-pending applications noted.

The driving means of my invention provides for operation of the uni-directionally operable actuator by means of a reversible crank or driver which controls the direction of actuation of the accumulator numeral wheels by the direction of rotation thereof, the direction of actuation of the counter numeral wheels being controlled normally in the same manner.

To provide for rotation of the accumulator actuator in the same direction irrespective of forward and reverse rotation of the crank, a pair of drive trains are interposed therebetween, one being active during one direction of rotation and the other being active during the other direction of rotation. Crank handle 71 (Fig. 6) is secured on the outer square end of drive shaft 72 which is journalled by bushings 73, 74 in control plate 76 and side frame member 13. Intermediate its ends, shaft 72 has annular collar 77 (Figs. 3 and 6) between gears 78, 79 having their hubs journalled on shaft 72 in abutting relation with collar 77 and bushings 73, 74, respectively. Gear 78 (Fig. 3) constantly meshes with gear 81 on transverse shaft 32 and forms therewith one of the drive trains from drive shaft 72 to transverse shaft 32. Gear 79 meshes with idler gear 82 which also meshes with gear 83 fast on shaft 32 and secured to gear 81. Gears 79, 82 and 83 form the other drive train from driving shaft 72 to transverse shaft 32.

To select which drive train is to be active in accordance with the direction of rotation of drive shaft 72, collar 77 is recessed at 86 to receive the free ends or noses of oppositely facing one way acting pawls 87, 88 in the full cycle or neutral position of collar 77. Pawls 87, 88 are pivoted on respective gears 78, 79 and are urged to the position shown in Fig. 3 under the influence of respective springs 89. In operation, if drive shaft 72 and collar 77 are turned in a clockwise direction (as viewed in Fig. 3) the flat end face of pawl 88 is engaged by the left side wall of notch 86, while the inclined face of pawl 87 is engaged by the right side wall thereof. Thus, a drive connection obtains between collar 77 and pawl 88, so that pawl 88 and gears 79, 82 and 83 form the active drive train between drive shaft 72 and transverse shaft 32, while pawl 87 is cammed outwardly and rides idly around the periphery of collar 77, gears 78 and 81 also rotating idly with pawl 87. Conversely, if the rotation of collar 77 is in the opposite or counterclockwise direction, the flat end face of pawl 87 is engaged by the right side wall of notch 86 to establish a drive connection, and pawl 88 is cammed outwardly by the left side wall thereof so that pawl 87 and gears 78, 81 form the active drive train, while pawl 88 and gears 82 and 83 rotate idly. It is to be noted that all gears of both drive trains rotate each time drive shaft 72 is rotated, and that the rotation of each gear is always in the same direction irrespective of the direction of rotation of drive shaft 72. This occurs because gears 78 and 79 always rotate in opposite directions, irrespective of whether the drive is transmitted through pawl 87 to gear 78 or through pawl 88 to gear 79, in accordance with the direction of rotation of collar 77.

Means is provided for enforcing a full rotation of drive shaft 72 each time it is moved from the full-cycle position in which it is held resiliently, such means including a pawl which is operative to prevent reverse movement in either direction of rotation after such rotation is started. At its inner end, drive shaft 72 (Fig. 6) has hub 101 pinned thereon abutting bushing 74. Hub 101 has an annular flange to the sides of which ratchet gear 102 and full cycle cam 103 are pinned in spaced relation. Pawl 106 is pivoted intermediate its ends on spacer 107 mounted on side frame member 13 to locate pawl 106 in the plane of ratchet gear 102. Gear 102 (Fig. 5) has cut-away portion or notch 108 in which the upper end of pawl 106 is received in the full cycle position of the parts shown in Fig. 5. Such full-cycle position is maintained releasably by spring urged centralizing arm 109 having a roller seating in the recessed portion of cam 103 with the parts in full cycle position. Pawl 106 is allowed limited movement in either direction by pins 111 spaced to either side of the lower end thereof, so that upon movement of ratchet gear 102 in either direction, pawl 106 will be positioned to lock gear 102 and drive shaft 72 against reverse movement until a complete rotation in such direction is completed.

Means are provided for speeding up the action of pawl 106 so that a smaller arc can be used for notch 108 in gear 102 and so that pawl 106 will be quickly moved from one extreme position thereof to the other when rotation in one direction is followed by rotation in the other. For this purpose, thin arm 112 of resilient material is mounted for pivotal movement about collar 101 between gear 102 and cam 103, being held against gear 102 by opposite spring pressed balls 113 (Figs. 5 and 6) suitably mounted in cam 103. The offset lower end of arm 112 is bifurcated to receive pin 114 on the upper end of pawl 106. Because of the spring pressure urging arm 112 against gear 102 it partakes of rotation therewith in either direction to an extent limited by the movement of pawl 106 between pins 111. Thus, the first part of any rotation of drive shaft 72 and gear 102 in either direction serves, through arm 112, to place pawl 106 in active position for the selected direction of rotation. It is to be noted that arm 112 serves to maintain pawl 106 out of engagement with the teeth of gear 102 during the time the original direction of rotation from full-cycle position is maintained, however, upon any attempted reversal of direction before a complete rotation arm 112 will move pawl 106 rapidly into blocking relation with respect to gear 102.

Figures 7, 8:
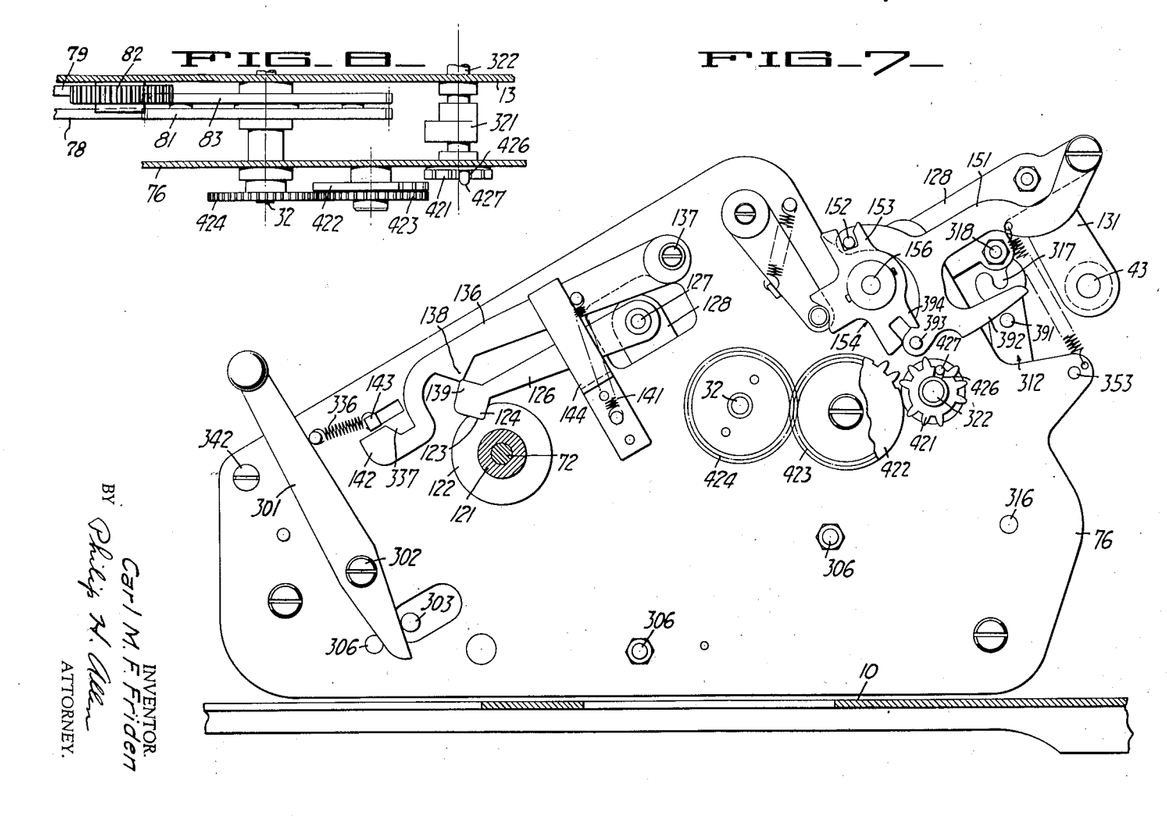
Figure 7 is a right side elevational view of the machine with the casing and register carriage omitted showing the control plate and associated parts.
Figure 8 is a plan view of the drive train shown in part in Figure 3 and in part in Figure 7.
Figure 9:
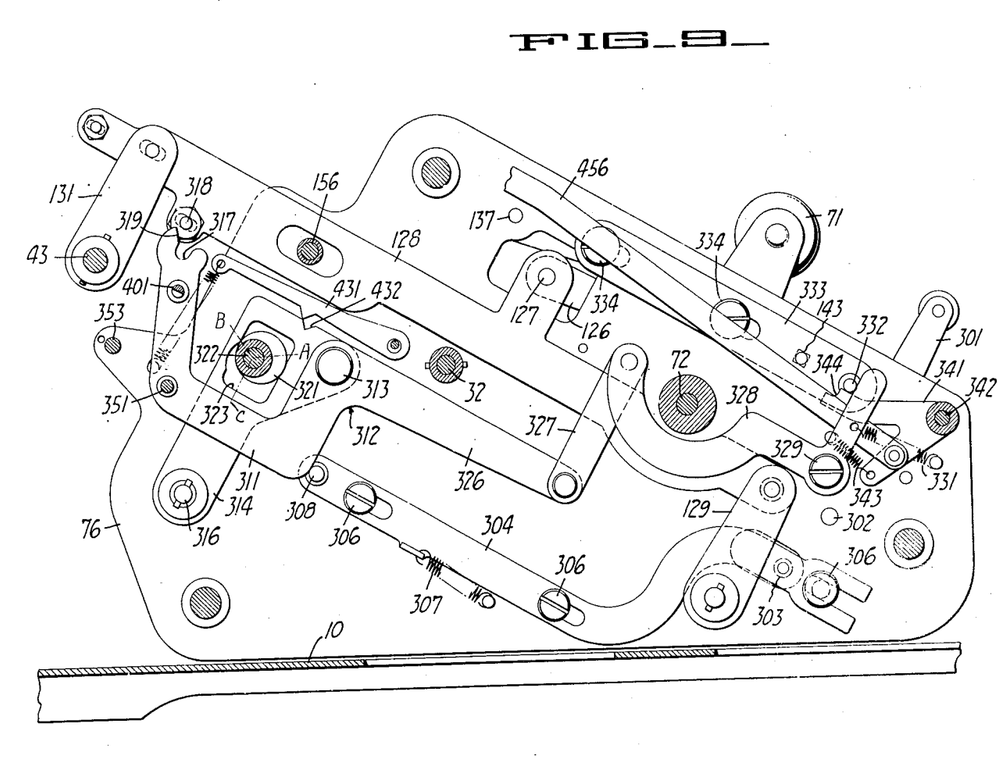
Figure 9 is a left side elevational view of the control plate and associated parts.

Means are provided for automatically setting the reversing gears or connecting means for the actuating means and the accumulator numeral wheels to determine addition or subtraction in accordance with the direction of rotation of the drive shaft and hand crank. Collar 121 (Figs. 6 and 7) secured on drive shaft 72 between plate 76 and handle 71 has annular flange or disk 122 which is notched at 123 to receive projection or nose 124 of arm 126 in the full cycle position of drive shaft 72 and collar 121. Arm 126 (Fig. 7) is pivoted at 127 on an upstanding ear of plus-minus slide or member 128 (Figs. 7 and 9) which is mounted at one end by link 129 (Fig. 9) on control plate 76 and at its other end by arm 131 fixed on shaft 43. Forward and rearward movement of plus-minus slide 128 rocks shaft 43 to mesh gears 38 or 39 (Fig. 1) with numeral wheel gears 24 to determine positive or negative registration on numeral wheels 22. Arm 126 (Fig. 7) and notch 123 are utilized in normal operation with arm 136 to control the position of plus-minus slide 128, which is shown in its neutral position in Figs. 7 and 9. Arm 136 (Fig. 7) has eccentric pivot 137 on plate 76 and has V-shaped nose 138 engaged with V-shaped nose 139 of arm 126 under the tension of spring 141. Upward movement of arm 136 from the position shown in Fig. 7 is prevented by the engagement of projection 142 at the end of arm 126 with stop pin 143. Arms 126 and 136 are maintained in position against plate 76 by guide strap 144 secured on plate 76 and having its upper offset end spaced therefrom to receive arms 126 and 136.

When shaft 72 and disk 122 rotate in a clockwise direction as viewed in Fig. 7, nose 139 of arm 126 is moved to the right of nose 138 of arm 136 and the action of the engaged cam surfaces thereof results in shifting arm 126 and plus-minus slide 128 rearwardly of the machine to mesh plus gears 38 (Fig. 1) with numeral wheel gears 24 and determine positive registration on numeral wheels 22. Conversely, counter clockwise rotation of drive shaft 72 and disk 122 causes movement of arm 126 and plus-minus slide 128 forwardly of the machine to mesh minus gears 39 with gears 24 and determine negative registration on numeral wheels 22. Either position of arm 126, slide 128 and gears 38, 39 is maintained for a complete revolution by the engagement of nose 124 of arm 126 with the unbroken periphery of disk 122 (Fig. 7). At the end of a registration when slide 128 is released, slide 128, gears 38, 39 and arm 126 may be restored to their neutral or inactive position by suitable centralizing means (not shown).

The control of plus-minus slide 128 as described above also serves to control the direction of registration on the counter register. To effect this result, arm 151 (Fig. 7) pivoted to the rear end of slide 128 extends forwardly and is spring-urged to position pin 152 thereon in notched upper end 153 of lever 154 secured on shaft 156. Shaft 156 is pivotally mounted in plate 76 and side member 13 (Fig. 3) and adjacent side member 13 has forwardly extending arm 157 secured thereon. Arm 157 carries pin 158 engaged with yoke 63 (Fig. 5) to control shifting movement thereof. Thus, forward and rearward movement of plus-minus slide 128 causes rocking movement of lever 154, shaft 156 and arm 157 to position yoke 63, which may control positive and negative registration on the counter register in any suitable manner.

Figure 10:
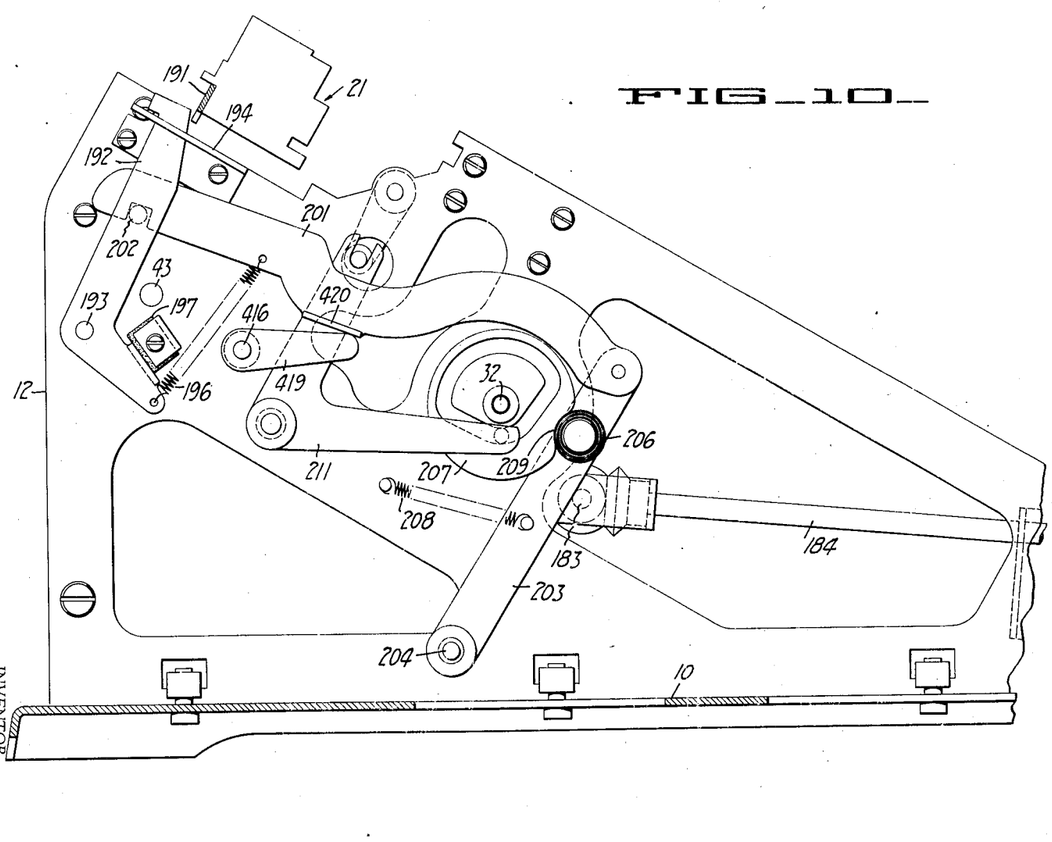
Figure 10 is a left side elevational view of the left side frame member and certain control mechanisms mounted thereon.

Manually operable means is provided for shifting the carriage in either direction. Carriage 21 (Fig. 11) has shift rack 170 pivoted thereon at 171 and having ordinally spaced notches 172, end notches 172 being formed in part by spring-connected yieldable pawls 173. Shift gear 174 (Figs. 1 and 11) journalled on cross frame member 16 has shift pins 175 for engagement with notches 172 so that one-half revolution of shift gear 174 effects one ordinal spacing of carriage 21 in the selected direction. The carriage is centered resiliently in position by spring urged centralizing arms 176 having rollers engaging cam 177. The drive train for shift gear 174 includes idler gear 178 meshed therewith and journalled in frame member 16 and plate 179 (Fig. 1) mounted in spaced relation on frame member 16. Idler gear 178 also meshes with gear 181 (Figs. 1 and 11) on shaft 182 which is journalled in cross frame members 16 and 18 (Fig. 1) and at its front end has a bevel gear connection with one end of transverse shaft 183 journalled in suitable brackets on frame member 18. At its other end adjacent the left side of the machine, shaft 183 (Figs. 1 and 10) has a suitable bevel gear connection with shaft 184 which may be supported in any convenient manner to extend through the front of the machine where a suitable operating handle (not shown) is provided. By turning the operating handle and shaft 184 one-half revolution in either direction, one ordinal spacing of carriage 21 is effected in either direction.

Means are also provided for shifting the register carriage by power from the actuating means in plural order problems such as division. Such means includes gear 186 (Figs. 1 and 11) on sleeve 187 and meshing with idler gear 178. Sleeve 187 is journalled in frame member 16 and plate 179 and has a normally disengaged drive connection with shiftable collar 188 by means of opposed teeth on collar 188 and corresponding slots in sleeve 187. Collar 188 is slidably mounted for driving engagement with an actuating shaft 31 and has full-cycle pawl 189 associated therewith as fully disclosed in said application No. 27,338. The shifting of carriage 21 through sleeve 187 and collar 188 from the associated actuating shaft is explained fully hereinafter in connection with the operation of the machine in performing a division problem.

Figure 11:
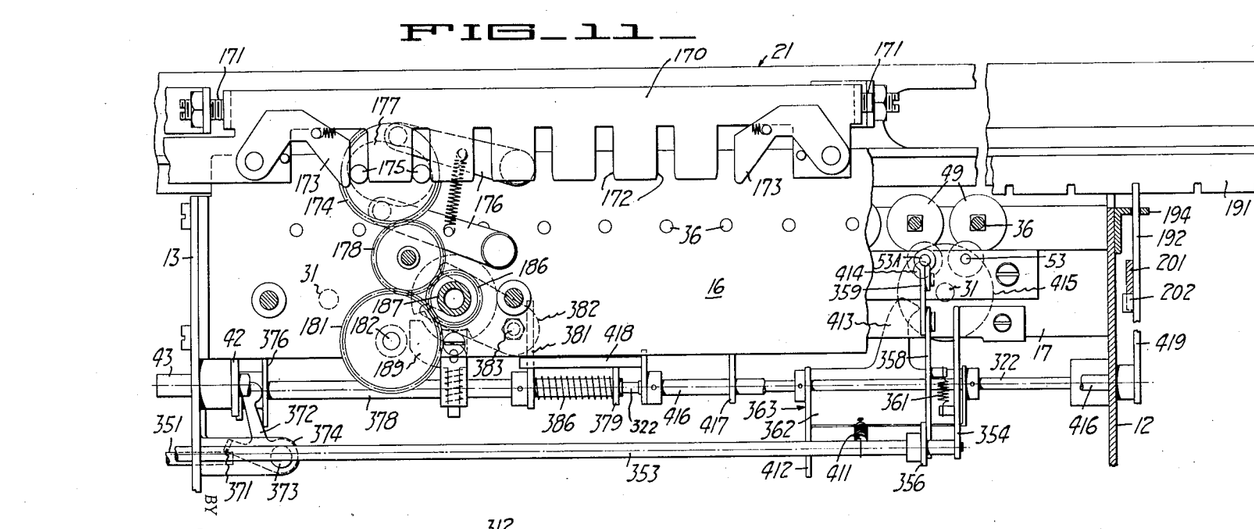
Figure 11 is a fragmentary rear elevational view of the machine, and is indicated by the line 11—11 in Fig. 1.

Means are provided for preventing shifting of the register carriage when the plus-minus gears are enabled and the machine is operating to perform a registration on the accumulator. Carriage 21 at its left end (to the right as seen in Fig. 11) is provided with ordinally notched member or bar 191 for cooperation with the upper arm of interlocking bellcrank lever 192 (Fig. 10) pivoted at 193 on side frame member 12. The upper arm of lever 192 is received in slotted guide 194 on side member 12 and registers with a notch of bar 191 when carriage 21 is located in one of its ordinal positions. Bellcrank lever 192 is urged normally to its inoperative position shown in Fig. 10 by spring 196 which holds the lower end thereof against resilient bumper 197 on side frame member 12.

Means are provided for moving lever 192 in synchronism with the operation of the actuating means. For this purpose link 201 (Fig. 10) has its notched rear end engaged with pin 202 on lever 192 under the tension of spring 196, and has its front end pivoted to the upper end of rock arm 203. Arm 203 is pivoted at 204 on side frame member 12 and has roller 206 of resilient material held against cam 207 by spring 208. Cam 207, which is secured for rotation with transverse shaft 32 and serves with bellcrank 211 and associated members as a part of the drive means for counter actuator 62 as fully described in said application Serial No. 27,338, has depression 209 in which roller 206 is seated in the full cycle position of the parts so that link 201 maintains lever 192 in its inactive position. Upon movement of shaft 32 and cam 207 from full cycle position, roller 206 moves out of depression 209 onto the high part of cam 207 so that arm 203 and link 201 are actuated to move lever 192 into engagement with a notch of bar 191 during the entire actuating cycle to prevent carriage shifting. Conversely, if carriage 21 is out of ordinal position thereof, movement of the actuating means is prevented as lever 192 is out of alignment with the notches of bar 191. Bar 191, lever 192 and associated parts serve, therefore, as interlock means to prevent simultaneous registration on the accumulator and shifting of the carriage. As described hereinafter, such interlocking means is disabled when it is desired to shift the carriage by operation of the actuating means during a plural order operation such as division.

The above described mechanisms cooperate with mechanism about to be described in performance of plural order machine operation in solving problems in division. The conventional method of division is used which comprises repeated subtraction until an overdraft, correction of the overdraft, and shifting of the dividend register to the next lower order where the process is repeated. The number of subtractions in each order is registered in the revolutions counter as the quotient. The mechanism disclosed herein for performing division by the above method provides for programmed operation of the machine under control of a program control device which, upon each overdraft in the dividend register, initiates a predetermined sequence of operations during uninterrupted cyclic operation of the actuating means. The term "program control device" as used herein refers to that part of the division control mechanism, which, when an overdraft occurs, is placed in operation to determine the corrective addition, shifting of the carriage, and resetting of the machine for subtraction. The machine is conditioned for a division operation by manipulation of a division starting control lever which enables the program control device with respect to the plus-minus control of the machine and with respect to the overdraft mechanism. Thereafter, the division operation is performed by uninterrupted turning of the hand crank in a single direction, the normal control of the plus-minus gears and the manual shift mechanisms having been superseded by automatic means associated with the program control device. For convenience in description, the setting of the machine for division will be described first.

The division starting control is operative to connect the program control device to the plus-minus control of the machine and to the overdraft mechanism, to enable the automatic shift control, and to set the counter or quotient register to obtain a true figure quotient.

Division control lever 301 (Fig. 7) is pivoted at 302 on control plate 76 and has its lower end in operative relation with pin 303 on division setting slide 304. Slide 304 (Fig. 9) is mounted for endwise movement by slots formed therein and engaged by studs 306 on plate 76. Spring 307 tensioned between slide 304 and plate 76 urges slide 304 to its forward position illustrated in Fig. 9. At its rear end, slide 304 carries pin or roller 308 in abutting relation with a depending part of arm 311 of connecting lever 312 which is spring urged to this position by means later described. Lever 312 is pivoted at 313 on arm 314 which is supported pivotally at 316 on plate 76. Arm 314, as later described, forms a part of the program control device and is oscillated in controlling machine operation.

From the foregoing description, it is seen that rearward movement of division setting slide 304 (Fig. 9) serves thru roller 308 to rock lever 312 in clockwise direction about its pivot 313. Such clockwise movement serves to connect the program control device with plus-minus slide 128 and to disable the normally operative plus-minus control from hand crank 71 as explained hereinafter. To enable the program control device, the rearward end 311 of lever 312 is provided with notch 317 adapted to engage pin 318 which is adjustably mounted in a slot formed in plus-minus slide 128 by a suitable clamping nut. The movement of bellcrank 312 to engage notch 317 with pin 318 serves to move slide 128 forwardly by virtue of inclined edge 319 adjacent notch 317, thereby rocking shaft 43 and meshing gears 24, 39 so that the machine is set for subtraction. This action occurs because of the position of connecting lever 312 as determined by arm 314 and control cam 321 on shaft 322 of the program control device, which in their normal condition are positioned to set the machine for subtraction at the beginning of a division operation. Cam 321 engages aperture 323 in arm 314 and is rotated in a manner described later to adjust plus-minus slide 128 from neutral to its addition or subtraction positions.

The above described setting of the machine for subtraction can be effected by virtue of the action of connecting lever 312 in disabling the normal plus-minus control of hand crank 71, as will now be explained. Front arm 326 (Fig. 9) of connecting lever 312 is connected by link 327 with the horizontal arm of bellcrank lever 328 pivoted at 329 on plate 76. Bellcrank lever 328 is urged to the position shown by spring 331 tensioned between lever 328 and plate 76, the limit of movement being determined by the engagement of arm 311 of connecting lever 312 with roller 308 as spring 331 also tends to maintain connecting lever 312 in its inoperative position. The vertical arm of bellcrank lever 328 abuts pin 332 on slide 333 mounted for endwise movement by slots engaging studs 334 on plate 76. Slide 333 carries stop pin 143 (Figs. 7 and 9) which extends through plate 76 for cooperation with arm 136 (Fig. 7) of the normal plus-minus control of the machine. Slide 333 and pin 143 are maintained normally in active position by spring 336 tensioned between stop pin 143 and plate 76. The above described linkage operates, upon movement of connecting lever to operative position, to move slide 333 (Fig. 9) rearwardly of the machine and position stop pin 143 (Fig. 7) in its inactive position over notch 337 in arm 136. Thus, when the machine is set for division, rotation of cam disk 122 merely causes arms 126 and 136 to oscillate idly without effect on the setting of plus-minus slide 128. Latch means are provided for maintaining such inoperative condition of the normal plus-minus control means during the entire division operation. Bellcrank latch lever 341 (Fig. 9) is pivoted at 342 on plate 76 and is urged in a clockwise direction by spring 343 connected between lever 341 and plate 76. Pin 332 on slide 333 normally maintains latch lever 341 in the position shown, however, when slide 333 is moved rearwardly to its disabling position where stop pin 143 is positioned above notch 337, pin 332 is engaged by latching notch 344 of lever 341 to maintain the normal plus-minus control in disabled condition. The means for disabling latch 341 at the end of a division operation is described hereinafter.

Figure 12:
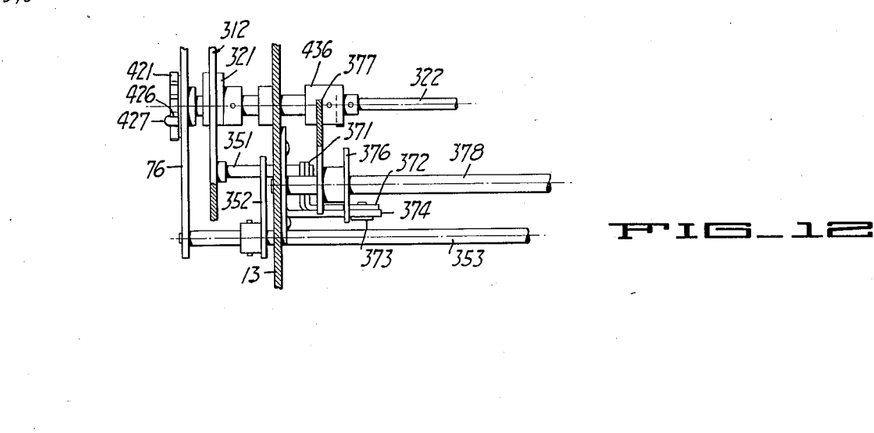
Figure 12 is a fragmentary horizontal section taken in a plane indicated by the line 12—12 in Fig. 5.

The clockwise oscillation of connecting lever 312 also serves to enable the overdraft mechanism with respect to the program control device. Pin 351 (Fig. 9) on rear arm 311 of lever 312 is disposed beneath arm 352 (Figs. 3 and 12) on an end of shaft 353 journalled in control plate 76, and bracket 354 (Fig. 11) mounted on cross frame member 17. Adjacent bracket 354 (Figs. 1 and 11), shaft 353 has arm 356 secured thereon having pin 357 (Fig. 1) disposed in a slot in link 358. Link 358 (Figs. 1 and 11) is pivotally supported at its upper end in bracket 359 secured on and depending from the extended end of transfer stub shaft 53A of next to highest order of the machine. Link 358 is urged to the inoperative position thereof shown in Fig. 1 by spring 361 which normally maintains the free end of link 358 below depending plate portion 362 of lever member 363 (Figs. 1 and 11) pivotally and non-slidably mounted on shaft 322 of the program control device. Upon clockwise oscillation of lever 312, pin 351 (Fig. 3) rocks arm 352, shaft 353 and arm 356 (Fig. 1) to lift link 358 into operative position with respect to plate portion 362 of lever member 363. In this condition of the parts, when an overdraft occurs, link 358 is operated to rock member 363 and thereby initiate operation of the program control device as explained more fully hereinafter.

As stated previously, movement of connecting lever 312 to operative position also serves to enable the automatic shift control. Pin 351 (Figs. 5 and 12) on lever 312 is of sufficient length to underlie bent end 371 of an arm of bellcrank lever 372 pivoted at 373 on bracket 374 secured to side frame member 13. The upper rounded end of lever 372 (Figs. 5, 11, and 12) engages grooved hub 376 of arm 377 which is moved as later described to initiate an automatic shifting operation. Hub 376 (Fig. 11) is fixed on shaft 378 which is mounted for endwise and rotative movement in side frame member 13 and bracket 379. Shaft 378 has arm 381 pinned thereon (Figs. 1 and 11) for cooperation with fork 382 mounted on rod 383 and engaging shift collar 188, shift collar 188 and rod 383 being urged to inactive position by spring 384 (Fig. 1) which is compressed between a suitable collar on rod 383 and frame member 18. Spring 386 (Fig. 11) compressed between arm 381 and bracket 379 normally maintains shaft 378 and arm 377 in inoperative position with respect to the shift initiating member of the program control device which is described later. Rocking movement of lever 372 by pin 351 serves to shift shaft 378 and arm 377 to the right as viewed in Figs. 11 and 12 into operative position immediately to the left of shift initiating cam 436, which, as explained hereinafter, after each overdraft in a division, is shifted to the left into the plane of arm 377.

To condition the quotient register actuator by changing the control thereof exerted by the plus-minus slide, connecting lever 312 (Fig. 7) has pin 391 underlying extension 392 of forked lever 151. Lever 151 has pin 393 normally out of engagement with notched lower end 394 of lever 154. Upward movement of connecting lever 312, through pin 391 and extension 392, moves pin 393 into engagement with lower end 394 of lever 154 and disengages pin 152 from upper end 153 thereof. Thus, lever 154 will be rocked in the opposite direction for a given movement of plus-minus slide 128 with pin 391 in operative position, than when pin 152 is active. As previously explained, rocking of lever 154 may be utilized to control the direction of actuation of the counter so that in division the direction of actuation of the counter is changed with respect to the accumulator and the quotient will be registered positively while the accumulator is being actuated negatively.

The above described mechanisms which are enabled by operation of division control lever 301 are maintained in active position by latch means which becomes effective to latch the settable parts in their above described adjusted positions during the division operation. Preferably the latch means is associated with connecting lever 312 to maintain said lever in its adjusted active position until the end of the division operation, or until such operation is interrupted by the operator. Adjacent its rear end, lever 312 (Figs. 3 and 9) has flat bottomed pin 401 projecting therefrom in operative relation with latch lever or member 402 (Fig. 3) pivoted at 403 on side member 13 and urged in a clockwise direction as viewed in Fig. 3 by spring 404. When lever 312 is moved by setting slide 304, pin 401 moves upwardly rocking latch member 402 until pin 401 rises above latching face 406 on member 402. Spring 404 then becomes effective to move face 406 beneath pin 401 whereby lever 312 and the parts adjusted thereby are maintained in operative relation. Thus, arm 314 of the program control device, connecting lever 312 plus-minus slide 128 and latch member 402 are latched together for movement as a unit, under the control of cam 321 of the program control device, slide 128 having been adjusted to its minus or subtracting position by virtue of the adjusted position of cam 321 and the action of cam face 319 of connecting lever 312. Also, overdraft control link 358 (Fig. 1) has been moved into operative relation with member 363 of the program control device.

When the division operation is begun by turning crank 71, the divisor set in the keyboard is subtracted repeatedly from the dividend entered in the accumulator or dividend register with the carriage positioned in the usual manner to obtain the highest order digit of the quotient. When the divisor is subtracted once too often, the resulting overdraft causes forward movement of the stub shaft 53A (Fig. 11) of the next to highest order after approximately 200° of the overdraft cycle. Such movement of shaft 53A is utilized through the overdraft control means to condition the machine for initiation of operation of the program control device, the actual initiation thereof, however, being effected by the actuating means. Upon an overdraft, shaft 53A and link 358 (Fig. 11) move forwardly, and, as link 358 has been moved into line with plate portion 362 (Fig. 1) of member 363, member 363 is rocked in a clockwise direction as viewed in Fig. 1 against the influence of spring 411 which normally maintains tail 412 of member 363 against shaft 353. Such clockwise movement of member 363 moves upwardly extending cam arm 413 (Figs. 1 and 11) of member 363 into the path of roller or pin 414 on disk 415, which is secured on actuating shaft 31 of highest order. Thus, the overdraft control means conditions the program control device for operation, such conditioning taking place after approximately 300° of the overdraft cycle.

Immediately after cam arm 413 is moved into the path of roller 414, it is engaged thereby to shift member 363 and shaft 322 to the left as viewed in Fig. 11 to start operation of the program control device, as described hereinafter. Thereafter, the program control device determines a predetermined sequence of operations including correction of the overdraft, shifting of the register carriage to the next lower order, and resetting of the machine for subtraction, means being provided to disable the interlock between the carriage and the actuating means during the actuating cycle which effects carriage shifting.

The program control device exercises its control by virtue of intermittent rotation of certain parts thereof including shaft 322 and cams 321 and 436 thereon during the overdraft cycle of the machine and the two succeeding cycles of the machine, after which the device is automatically disabled. To produce the intermittent movement of shaft 322, gear 421 (Figs. 7 and 8) is mounted on the end of shaft 322 which projects beyond the right hand side of control plate 76. Gear 421 is normally in the inoperative position shown in Fig. 8 out of the path of cooperating mutilated gear 422 (Figs. 7 and 8) which is driven cyclically through gears 423, 424 from transverse shaft 32. Such inoperative position is determined by notch 426 of gear 421 engaging over pin 427 on plate 76 under the urgency of suitable spring means (not shown) associated with shaft 322 to maintain gear 426 against plate 76. As seen in Fig. 7, gear 421 has three equally spaced sets of three teeth each for cooperation with the single set of three teeth provided on gear 422. Also, because gear 422 rotates in a counter clockwise direction as viewed in Fig. 7, its teeth are positioned to engage a set of teeth of gear 421 immediately before the end of a cycle. The arrangement is such, therefore, that when gear 421 is projected into the path of gear 422 during a cycle of operation, gear 421 is rotated one-third revolution at the end of that cycle and the two next succeeding cycles, being maintained in projected position by the engagement of pin 427 with the inner face of gear 421.

Figures 1, 2:
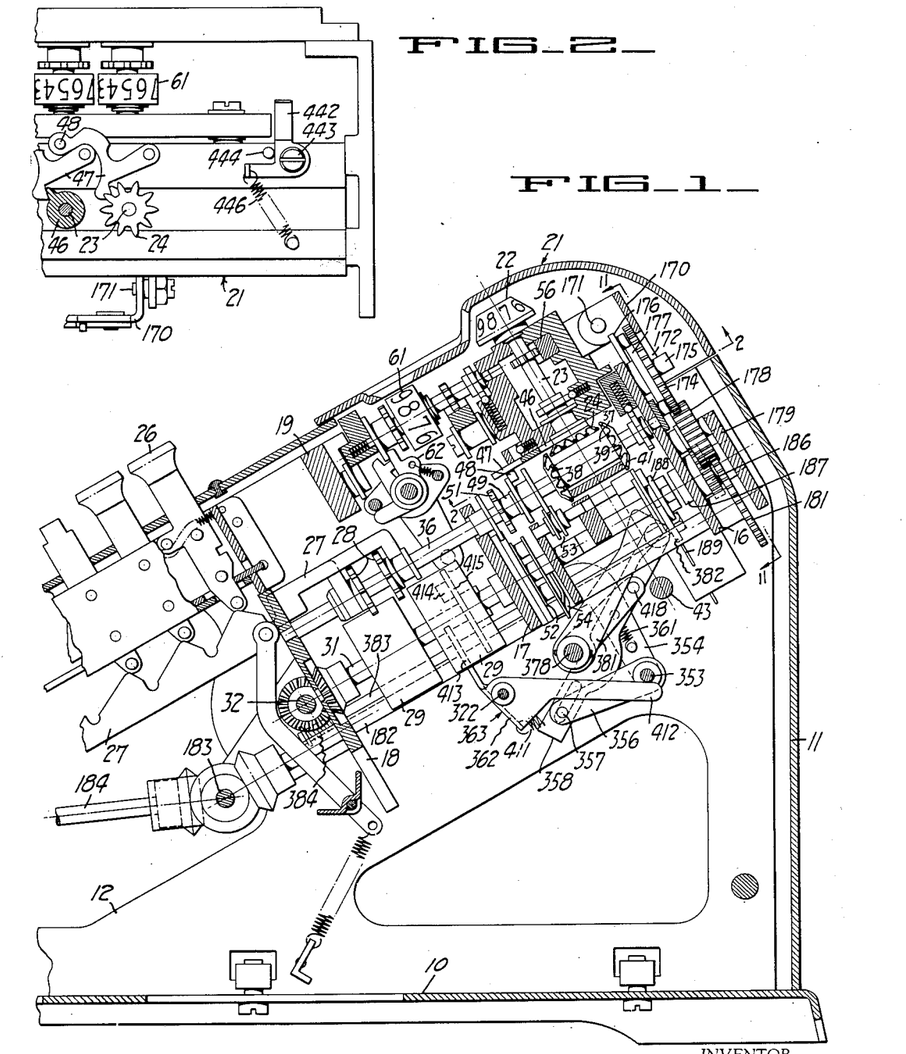
Figure 1 is a partial vertical, longitudinal section illustrating the rear portion of the machine.
Figure 2 is a bottom view of an end of the shiftable register carriage taken in a plane indicated by the line 2—2 in Fig. 1.

It will be recalled that, upon overdraft, cam arm 412 (Fig. 11) is moved into the path of roller 414 so that shaft 322 is moved to the right of the machine, or the left as seen in Fig. 11, and gear 421 is placed in operative relation with gear 422 from the inactive position thereof shown in Fig. 8. Thus, the first one-third rotation of shaft 322 occurs just before the end of the overdraft cycle. This first one-third rotation of shaft 322 is utilized to change the setting of the machine from subtraction to addition so that the next cycle of the actuating means will cause a correction of the overdraft. As described previously, eccentric cam 321 (Fig. 9) is normally positioned to set the machine for subtraction by moving plus-minus slide 128 forwardly of the machine when the machine is set for division by operation of lever 301, setting slide 304 and connecting lever 312. This position of cam 321 is indicated at A in Fig. 9. The one-third rotation of shaft 322 at the end of the overdraft cycle moves cam 321 from position A in a counter clockwise direction to position B, and such movement results in rearward movement of arm 314, connecting lever 312 and plus-minus slide 128 to set the machine for addition by meshing gears 24, 38 (Fig. 1).

Thus, the first operation cycle after an overdraft cycle, serves to correct the overdraft. At the end of the corrective cycle, the second one-third rotation of cam 321 and shaft 322 occurs and determines a carriage shift cycle of the machine. This is effected by setting plus-minus slide 128 to its neutral poistion where both gears 37, 38 are out of mesh with gears 24, as illustrated in Fig. 1, by engaging the automatic shift drive connection to determine a one step shift of carriage to the left, and by disabling the carriage and actuating means interlock mechanism. The second one-third rotation of shaft 322 (Fig. 9) moves cam 321 counter clockwise from position B to position C where a slight clearance is provided so that arm 314, lever 312, plus-minus slide 128 and gears 37, 38 can be centralized quickly in neutral position by the engagement of spring-urged latching pawl 431 with notch 432 in arm 314. Means are provided for engaging collar 188 (Fig. 1) with gear sleeve 187 during said second one-third rotation of shaft 322. Cam 436 (Figs. 5 and 12) fixed on shaft 322 adjacent right hand side member 13 is positioned normally out of alignment with arm 377 on shaft 378 even after enabling movement of arm 377 when setting the machine for division. When the program control device is enabled by shifting of shaft 322, cam 436 is moved into alignment with arm 377. Cam 436 is so positioned angularly on shaft 322 that it is effective to rock arm 377, shaft 378 and arm 382 to engage collar 188 with gear sleeve 187 during said second one-third rotation of shaft 322. Such engagement is maintained for one cycle of operation of the machine and effects one ordinal spacing of the carriage. To disable the interlock mechanism and enable such shifting of the carriage, shaft 416 (Fig. 11) mounted in bracket 417 and side member 12 has laterally offset extension 418 (Figs. 1 and 11) secured thereon at one end extending beneath shift control arm 381 and at its other end has arm 419 (Figs. 10 and 11) which engages beneath lateral extension 420 (Fig. 10) of actuating link 201 for interlocking lever 192. The shift determining movement of control arm 381 which, it will be recalled, occurs just before the shift cycle, rocks shaft 416 and arm 419 (Fig. 10) in a counter clockwise direction to disengage actuating link 201 from pin 202 on interlock lever 192. Thus, during an automatic shift operation, the interlock mechanism is disabled by operation of the program control device.

At the end of the shift cycle, shaft 322 receives its third one-third rotation to restore the program control device to its original condition, cam 321 (Fig. 9) being rotated from position C to position A to reset the machine for subtraction and shaft 322 (Fig. 7) being moved against plate 76 by spring pressure, notch 426 in gear 421 engaging over pin 427. As a result, subtraction begins in the new position of the carriage until an overdraft, when the program control device is again placed in operation as described above.

The described sequence of operations continues until the carriage is shifted into its lowest order position when division stop means become effective to unlatch the division control mechanism automatically after completion of the quotient figure of lowest order. To effect this control, the second one-third rotation of shaft 322 of the program control device after overdraft in the lowest order is utilized. Latch lever 402 (Fig. 3) is provided with upwardly extending arm 441 which lies in the path of "live" pawl 442 (Figs. 2 and 3) pivoted at 443 on the bottom slide of carriage 21 and held against stop pin 444 by spring 446. As the carriage is shifted into the lowest order position, pawl 442 strikes arm 441 and is turned about its pivot 443, the subtracting operation then ensues and pawl 442 is maintained out of the normal position thereof shown in Fig. 3 by arm 441 as the machine is set for subtraction. After the overdraft cycle, the machine is set for addition which causes counter-clockwise movement of latch lever 402 and forward movement of arm 441 thereof a sufficient amount to permit pawl 442 to move, under the influence of spring 446, into longitudinal blocking alignment with arm 441 so that further movement of latch lever 402 is prevented while the carriage is in its lowest order position. Therefore, when the second one-third rotation of shaft 322 and cam 321 occurs at the end of the additive overdraft correction cycle and plus-minus slide 128, lever 312, and pin 401 move forwardly of the machine, pin 401 moving off of latching face 406 to disable the division control mechanism. However, this action is not completed until the shift cycle has begun. This cycle is ineffective to shift the carriage because of yielding of the engaged one of pawls 173 (Fig. 11) and merely serves to complete the operation of the program control device and restore its parts to normal condition. Subsequent turning of crank handle 71 is, however, ineffective to cause registration because slide 333 (Fig. 9) is maintained in position by latch 341 to disable the normal plus-minus control. To enable such control, stop lever 451 (Fig. 3) pivoted at 452 on side member 13 and urged in a clockwise direction by spring 454 is connected by link 456 (Figs. 3 and 9) to latch lever 341. By oscillation of stop lever 451, latch lever 341 is moved to inactive position and stop pin 143 again becomes effective with respect to arm 136 as shown in Fig. 7.

Division stop lever 451 also provides means for terminating a division operation before shifting of the carriage to its lowest order position, as for example, when an erroneous factor has been set in the machine or the desired number of the quotient figures has been completed. For this purpose, lower end 461 (Fig. 3) of lever 451 is operatively associated with pin 462 on latch lever 402. Counter-clockwise movement of lever 451, therefore, is effective to move latch lever 402 to inoperative position and release connecting lever 312 and associated parts as brought out in describing the end of a division operation with the carriage in its lowest order position. Such delatching will be effective at the end of the cycle in progress and will usually result in an erroneous number in the lowest order quotient digit as all the actuations therein may not have been completed. This will result sometimes in gear 421 being maintained in active position by pin 427; however, this cannot result in a misoperation because the entire program control device, including the plus-minus and shift controls, are disabled with the release of connecting lever 312 from latch lever 402.

From the above description of the machine of my invention and its operation, it will be noted that the mechanism provides a simple and inexpensive construction in a hand operated calculating machine. Particular attention is called to the provision of automatic division by uninterrupted turning of the handle in a single direction in the machine in which the sign character of the registration of the accumulator is normally selected by rotation of the handle in either of two directions. In this connection, it is also to be noted the interlocking mechanism between the carriage and the actuating means is disabled to provide for automatic shifting of the carriage in the division operation.

While the invention is directed principally to the provision of the various features described in a hand operated calculating machine, certain of the features are also equally adaptable to a power operated calculating machine.

I, therefore, claim as my invention:

1. In a calculating machine having numeral wheels, means for controlling the sign character of registration on said numeral wheels, including V-shaped cam means, a drive member having a recess opposed to said cam means in the full-cycle position thereof, and a shiftable element seated in said recess and engaging the point of said cam means and movable by said member into engagement with either side of said cam means in accordance with the direction of rotation of said member, and control means for rendering said sign character controlling means ineffective.

2. In a calculating machine having numeral wheels, means for controlling positive and negative registration on said numeral wheels, including V-shaped cam means, means normally holding said cam means against movement, a drive member having a recess opposed to said cam means in the full-cycle position thereof, and a shiftable element seated in said recess and engaging the point of said cam means and movable by said member into engagement with either side of said cam means in accordance with the direction of rotation of said member, means for disabling said holding means and thereby releasing said cam means for movement to render said sign character controlling means ineffective, and means for latching said releasing means in active position.

3. In a calculating machine, reversible numeral wheels, actuating means therefor having an invariable direction of operation, reversing means between said numeral wheels and said actuating means, reversible drive means for said actuating means, a reversing control for said reversing means controlled by said drive means, automatic operation control means for said machine operated by said drive means and means for enabling said operation control means, and means controlled by said enabling means for disabling the control of said drive means over said reversing control.

4. In a calculating machine, reversible numeral wheels, actuating means therefor having an invariable direction of operation, reversing means between said numeral wheels and said actuating means, reversible drive means for said actuating means, a reversing control for said reversing means controlled by said drive means, automatic division control mechanism operated by said drive means and including a program control device for superseding the normal control exerted by said reversing control, means for enabling said control mechanism, and means brought into play by said enabling means for rendering said reversing control ineffective and for enabling said device with respect to said reversing means.

5. In a calculating machine having reversible numeral wheels, actuating means therefor having an invariable direction of operation, reversing means between said numeral wheels and said actuating means, reversible drive means for said actuating means, and a reversing control for said reversing means controlled by said drive means; automatic operation control mechanism including a program control mechanism for controlling said machine automatically, means for enabling said mechanism, and means controlled by said enabling means for rendering said reversing control ineffective.

6. In a calculating machine having reversible numeral wheels, actuating means therefor having an invariable direction of operation, reversing means between said numeral wheels and said actuating means, reversible drive means for said actuating means, and a reversing control for said reversing means controlled by said drive means; automatic operation control mechanism including a program control device for controlling said machine automatically, means for enabling said mechanism, means controlled by said enabling means for rendering said reversing control ineffective, and means for latching said last-named means in active position.

7. In a calculating machine having reversible numeral wheels, actuating means therefor having an invariable direction of operation, reversing means between said numeral wheels and said actuating means, reversible drive means for said actuating means, and a reversing control for said reversing means controlled by said drive means; automatic division control mechanism including a program control device for controlling said machine automatically in performing division, means for enabling said mechanism, means controlled by said enabling means for rendering said reversing control ineffective, means for latching said last-named means in active position, and means operable at the end of a division operation for releasing said latching means.

8. In a calculating machine, a shiftable carriage, a register in said carriage, actuating means for said register, means for shifting said carriage, means controlled by said actuating means for preventing shifting of said carriage during operation of said actuating means, automatic division operation control mechanism including means for causing operation of said shifting means, by said actuating means, means for enabling said mechanism and means controlled by said mechanism when enabled for rendering said preventing means ineffective.

9. In a calculating machine, numeral wheels, actuating means therefor, means for operatively connecting said numeral wheels and said actuating means, means for controlling a plural order division operation including means for controlling said connecting means, means for enabling said controlling means, and means operative at the end of a division operation for automatically rendering said connecting means ineffective during uninterrupted operation of said actuating means.

10. In a calculating machine, shiftable numeral wheels, actuating means therefor, means for operatively connecting said numeral wheels and said actuating means, means for shifting said numeral wheels, means for controlling a plural order division operation including means for controlling said connecting means and means for causing operation of said shifting means, means for enabling said controlling means, and means conditioned by shifting of said numeral wheels into the lowest order position thereof at the end of a division operation for rendering said connecting means ineffective during uninterrupted operation of said actuating means.

11. In a calculating machine having reversibly rotatable numeral wheels, settable means for controlling positive and negative registration on said numeral wheels, V-shaped cam means, a reversibly rotatable disc having a recess opposed to said cam means in the full-cycle position of said disc, a link connected to said settable means and extending between said cam means and said disc, said link having a portion for seating in said recess and a V-shaped nose opposite thereto for engagement with said cam means, said nose having its point engaging the point of said cam in the inactive position thereof and being movable into engagement with either side of said cam means in accordance with the direction of rotation of said disc, means blocking movement of said cam means away from said disc, and manually operable control means for moving said blocking means to inactive position.

12. In a calculating machine having numeral wheels, means for controlling positive and negative registration on said numeral wheels, including a V-shaped cam means, a drive member having a recess opposed to said cam means in the full-cycle position thereof, a shiftable element seated in said recess and engaging the point of said cam means and movable by said member into engagement with either side of said cam means in accordance with the direction of rotation of said member, and a stop normally blocking movement of said cam means away from said drive member, and control means for rendering said sign character controlling means ineffective.

13. In a calculating machine having reversibly rotatable numeral wheels, settable means for controlling positive and negative registration on said numeral wheels, and cyclically operable reversible drive means; means for controlling said settable means in accordance with the direction of rotation of said drive means including V-shaped cam means, a reversibly rotatable disc connected to said drive means and having a recess opposed to said cam means in the full-cycle position of said disc, a link connected to said settable means and extending between said cam means and said disc, said link having a portion for seating in said recess and a V-shaped nose opposite thereto for engagement with said cam means, said nose having its point engaging the point of said cam in the inactive position thereof and being movable into engagement with either side of said cam means in accordance with the direction of rotation of said disc.

14. In a calculating machine having numeral wheels, settable means for controlling positive and negative registration on said numeral wheels, and cyclically operable reversible drive means; means for controlling said settable means in accordance with the direction of rotation of said drive means including a V-shaped cam, a disc driven by said drive means and having a recess opposed to said cam in the full-cycle position thereof, a shiftable element having opposite V-shaped noses interposed between said cam and said disc, one of said noses being seated in said recess and the other of said noses engaging the point of said cam means in the inactive position thereof, said element being movable by said disc into engagement with either face of said cam in accordance with the direction of rotation of said disc.

15. In a calculating machine, a frame, a register carriage shiftable on said frame to a plurality of ordinally spaced positions, actuating means on said frame, means for shifting said carriage, a locking member on said frame oscillatable by said actuating means from an inactive to an active position relative to said carriage, means for controlling a division operation during continuous and uninterrupted operation of said actuating means including means for causing operation of said shifting means at the end of each ordinal division, means for enabling said controlling means, and said controlling means also including means controlled by said shifting causing means for rendering said blocking member ineffective during a shifting operation.

16. In a calculating machine having a shiftable register, actuating means therefor, and means for shifting said register, means for controlling a plural order division operation including normally disabled control means for initiating operation of said shifting means at the end of each ordinal operation, said operation controlling means being operable by said actuating means during continuous and uninterrupted operation thereof, means for enabling said operation controlling means, and means controlled by said enabling means for enabling said disabled control means.

17. In a calculating machine having a shiftable register, actuating means therefor, and means for shifting said register, means for controlling a plural order division operation including normally disabled control means for initiating operation of said shifting means at the end of each ordinal division operation, said division operation controlling means being operable by said actuating means during continuous and uninterrupted operation thereof, means for enabling said division operation controlling means, and means controlled by said enabling means for enabling said disabled control means.

18. In a calculating machine having a shiftable register, actuating means therefor, and means for shifting said register, means for controlling a plural order division operation including means for causing operation of said shifting means at the end of each ordinal division operation, said division operation controlling means beng operable by said actuating means during continuous and uninterrupted operation thereof, said causing means including a cam connected for intermittent driving operation at the end of each ordinal division operation and an arm operable by said cam for enabling the drive for said shifting means in division operations, said arm being normally out of the path of said cam, means for enabling said division operation controlling means, and means controlled by said enabling means for moving said arm into the path of said cam.

19. In a calculating machine having numeral wheels, reversible drive means, and means for selecting the sign character of the registration on said numeral wheels; means for controlling the setting of said selecting means in accordance with the direction of operation of said drive means including a member having adjacent oppositely facing cam surfaces, an element connected to said selecting means and shiftable endwise to control the setting thereof, said element having adjacent oppositely facing cam surfaces for cooperation with said member cam surfaces, and a rotatable disc connected to said reversible drive means and operatively associated with said element for engaging said cam surfaces to shift said element selectively in accordance with the direction of movement of said drive means.

20. In a calculating machine having numeral wheels, cyclically operable reversible drive means, means for controlling the sign character of registration on said numeral wheels, and means controlled by said drive means for setting said sign character controlling means; said last-named means including V-shaped cam means, a member driven by said drive means and having a recess opposed to said cam means in the full-cycle position thereof, and a shiftable element seated in said recess and engaging the point of said cam means and movable by said member into engagement with either side of said cam means in accordance with the direction of rotation of said member.

CARL M. F. FRIDEN.